Figure 1:
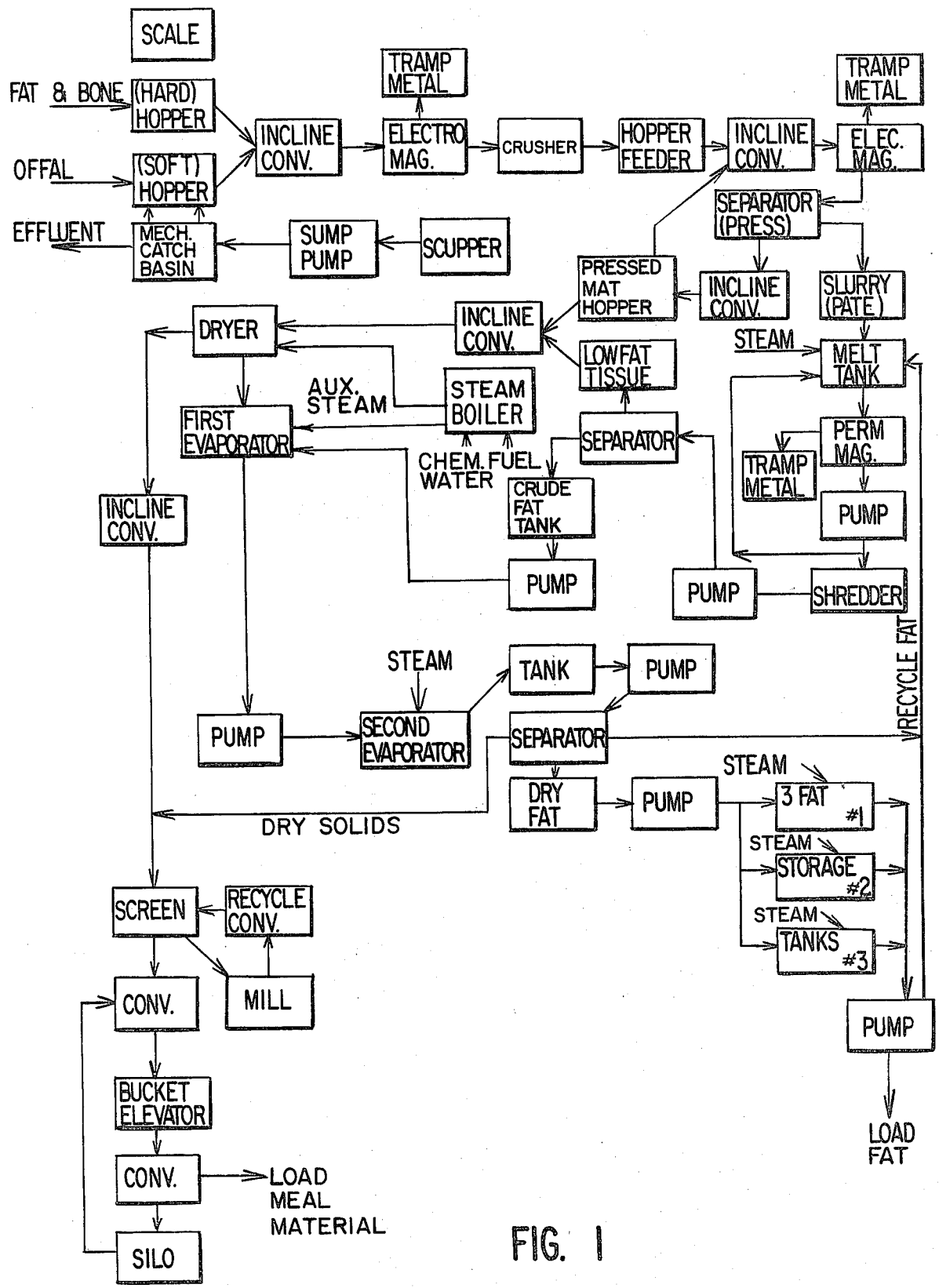

United States Patent [19]

Wojcik

[11] 4,361,590
[45] Nov. 30, 1982

[54] PROCESS FOR SEPARATING AND RECOVERING FAT AND PROTEINACEOUS MATERIAL FROM RAW ORGANIC MATERIAL

[75] Inventor: Herbert W. Wojcik, Palos Heights, Ill.

[73] Assignee: Darling-Delaware Co., Inc., Chicago, Ill.

[21] Appl. No.: 205,781

[22] Filed: Nov. 10, 1980

Related U.S. Application Data

[63] Continuation-in-part of Ser. No. 112,204, Jan. 15, 1980, Pat. No. 4,232,425, which is a continuation-in-part of Ser. No. 966,078, Dec. 4, 1978, abandoned.

[51] Int. Cl.³ .............................................. A23L 1/31
[52] U.S. Cl. ...................................... 426/480; 17/46; 260/412.6; 426/417; 426/646
[58] Field of Search ............... 426/417, 480, 646, 657; 17/46, 1 G; 260/412.6, 412; 241/24, 23

[56] References Cited

U.S. PATENT DOCUMENTS

| | | |
|---|---|---|
| 3,046,286 | 7/1962 | Speer et al. |
| 3,087,945 | 4/1963 | Schellenberg |
| 3,266,543 | 8/1966 | Paoli |
| 3,352,841 | 11/1967 | Lyon |
| 3,352,842 | 11/1967 | Lyon |
| 3,739,994 | 6/1973 | McFarland |
| 3,741,772 | 6/1973 | McFarland |
| 3,841,569 | 10/1974 | Englehardt et al. |
| 3,906,118 | 9/1975 | McFarland |
| 4,025,001 | 5/1977 | Yarem et al. |
| 4,049,684 | 9/1977 | McFarland |

FOREIGN PATENT DOCUMENTS

| | | |
|---|---|---|
| 951563 | 7/1974 | Canada |
| 901845 | 7/1962 | United Kingdom ................ 426/480 |
| 502011 | 8/1976 | U.S.S.R. |

OTHER PUBLICATIONS

The Pfaudler Conversion System, Flow Sheet, Process, marketed by The Pfaudler Co., 1000 West Avenue, Rochester, New York (Exhibit No. 1).
Meat Processing, May 1975.
Anderson C-G Process Flow Sheet, Anderson IBEC, Cleveland, Ohio.
Render, Oct. 1980, pp. 10, 11, 13, 19 and 27 (1980).
2,911,421 – 11-1959 – Greenfield.
2,875,222 – 2-1959 – Dormitzer.

Primary Examiner—Raymond N. Jones
Assistant Examiner—George C. Yeung
Attorney, Agent, or Firm—Merriam, Marshall & Bicknell

[57] ABSTRACT

A continuous process for preparing stabilized fat, stabilized protein meal and low fat stabilized bone for producing high quality gelatin and glue from raw organic material containing fat, soft proteinaceous tissue and high density proteinaceous material by crushing the raw material in a rough sizer and continously feeding the crushed raw material to a press to form a soft low density proteinaceous material and a major proportion of the fat. A pressed high density material is discharged from the press separately from the soft wet low density material. The fat is separated from the soft wet low density material, dried and the suspended solids therein removed to provide a stable light colored fat product. The separated pressed high density material and the wet low density material having a low fat content are heated to reduce the moisture content below about 10 wt. percent moisture and effect crisping any fat and tissue adhering to the high density material. The dried low density material and crisped fat and meat tissue are recovered as stable protein meal product. High density proteinaceous material can be separated from the dried material to provide a high quality gelatin bone material.

12 Claims, 5 Drawing Figures

PROCESS FOR SEPARATING AND RECOVERING FAT AND PROTEINACEOUS MATERIAL FROM RAW ORGANIC MATERIAL

This is a continuation-in-part application of applicant's co-pending U.S. Ser. No. 112,204, filed Jan. 15, 1980, now U.S. Pat. No. 4,232,425, which was a continuation-in-part of co-pending U.S. Ser. No. 966,078, filed Dec. 4, 1978, now abandoned.

The invention relates generally to the separation and recovery of fat and one or more solid proteinaceous materials, such as meat meal and gelatin bone, from raw animal, poultry and fish material, offal and other raw organic material containing useful proteinaceous and fatty materials. More particularly, the invention resides in providing an improved low energy continuous process for separating and recovering a stabilized high quality fat product and a stabilized low fat meat meal product from raw organic animal material containing fat and soft proteinaceous material. Stabilized clean bone material suitable for making glue and gelatin can also be recovered when the raw material used includes an appreciable amount of raw bone material.

When processing rendering material, raw trimmed bone, animal offal and similar raw organic material containing fat and proteinaceous material to separate and recover fat and/or or more solid proteinaceous materials in accordance with present commercial processes, the raw materials containing fat, meat tissue, bone and other proteinaceous material have generally been treated by substantially reducing the particle size of the raw material and/or heating all the raw material for a prolonged period while in contact with an aqueous media in the form of steam and hot water or by heating the material while in contact with liquid fat to liquify the fat in the raw material and reduce the moisture in the raw material to below about 10 wt.% before separating the fat from the material. When raw trimmed boe or other fat-containing raw proteinaceous material is heated while in contact with the hot aqueous media, as in a dry rendering process, for a period sufficiently long to effect liquifying the fat and significantly reduce the moisture content of the meat tissue, a significant portion of the protein in the raw material is degraded and the quality of the fat is reduced. Also, when the bone is heated in a bath of liquid fat, the pores of the bone become saturated with the fat and the surface of the bone material is covered with a layer of fat so that the appearance and quality of the bone for making high quality gelatin and glue are reduced.

In order to avoid lowering the economic value and the quality of the proteinaceous material associated with offal and raw bone material during the recovery of fat and meat values, low temperature deboning processes have been devised to recover the fat and meat tissue without heating to affect cooking and in which the raw bone is substantially subdivided and thereafter compressed in a press having a screw mounted within a perforated casing so that soft non-bone portions comprising mainly fat, meat tissue, bone marrow, blood and, moisture which are forced through perforations in the casing wall and recovered as pate while the pressed bone material and similar hard proteinaceous material along with a small amount of residual fat and meat tissue and similar soft proteinaceous materials are discharged separately from the end of the casing. However, the pate produced in such deboning processes has been used only in pet food and other food products, and the fat and/or meat values pressed from the raw organic material have not heretofore been separated and recovered as distinct products by a process in which the raw material is mechanically treated in the initial step of the process to separate and remove a major proportion of the fat and a large amount of the soft proteinaceous material without first finely subdividing all the raw material and/or without subjecting all the raw material to heating while in contact with a hot aqueous medium or in a heated bath of liquid fat to effect drying.

An equally serious objection to previously known methods of separating and recovering as distinct products fat and/or one or more proteinaceous solids from raw organic material, such as rendering material, trimmed raw bone and offal, is the inordinate total amount of energy consumed in previously known processes. Thus, with the previously known methods a large amount of energy is required to reduce the raw bone material to a size suitable for heating effectively in an aqueous or fat bath so that the fat is liquified and readily separated from the meat tissues and so that moisture is more readily separated. Also, when raw rendering material containing a normal amount of fat with associated protein tissue and about 55 wt.% moisture is heated to effect liquifying the fat, the heat transfer efficiency drops from about 1200 btu/hr to about 300 btu/hr as the moisture content reaches about 15 wt.%. The boiling point of an aqueous fat liquid containing the amount of fat normally present in raw rendering material and about 55 wt.% moisture with about 15 wt.% protein rises from about 212° F. to about 245° F., as the moisture content approaches 15 weight percent moisture at atmospheric pressure. However, when a similar aqueous solution having a low fat content is heated to boiling to remove moisture, the boiling point remains at about 212° at atmospheric pressure as the moisture content of the low fat liquid approaches 15 wt. percent. Furthermore, when cooking the total raw rendering mixture with its relatively high fat content, it is generally considered necessary to heat the mixture to a temperature between 260° F. and 300° F. in order to utilize maximum cooking capacity and insure a low fat content when the heated mixture is pressed to remove the liquified fat. A large amount of energy is required to grind the hard dry cake from the press after separating the fat. And, it is evident that heating a mixture having a low heat transfer efficiency to a temperature of between 260° F. and 300° F. before separating the fat requires the expenditure of additional large amounts of energy, degrades the quality of the products, increases the equipment maintenance costs, particularly due to frictional wear in the press when the fat is separated from dry material in an expellor press and increases the cost of in-plant air treatment to control objectionable odors.

It is therefore an object of the present invention to provide a more economical process of separating and recovering stabilized fat and/or solid proteinaceous materials from raw organic material.

It is also an object of the present invention to provide an energy sparing process for separating and recovering stabilized fat and solid proteinaceous materials from raw animal material.

It is another object of the present invention to provide an energy sparing process of separating and recovering stabilized fat and proteinaceous solids from raw poultry and fish material.

It is still another object of the present invention to provide a stabilized high quality fat and/or meat meal material from raw animal material in a more economical manner.

It is a further object of the present invention to provide an integrated process for treating raw animal material containing fat, meat tissue and bone to obtain high yields of stabilized fat, stabilized low fat meat meal material having a high protein value and stabilized low fat gelatin bone suitable for making high quality glue and gelatin.

It is a still further object of the present invention to provide an improved process for making glue and gelatin from low fat bone material.

Figure 2A:
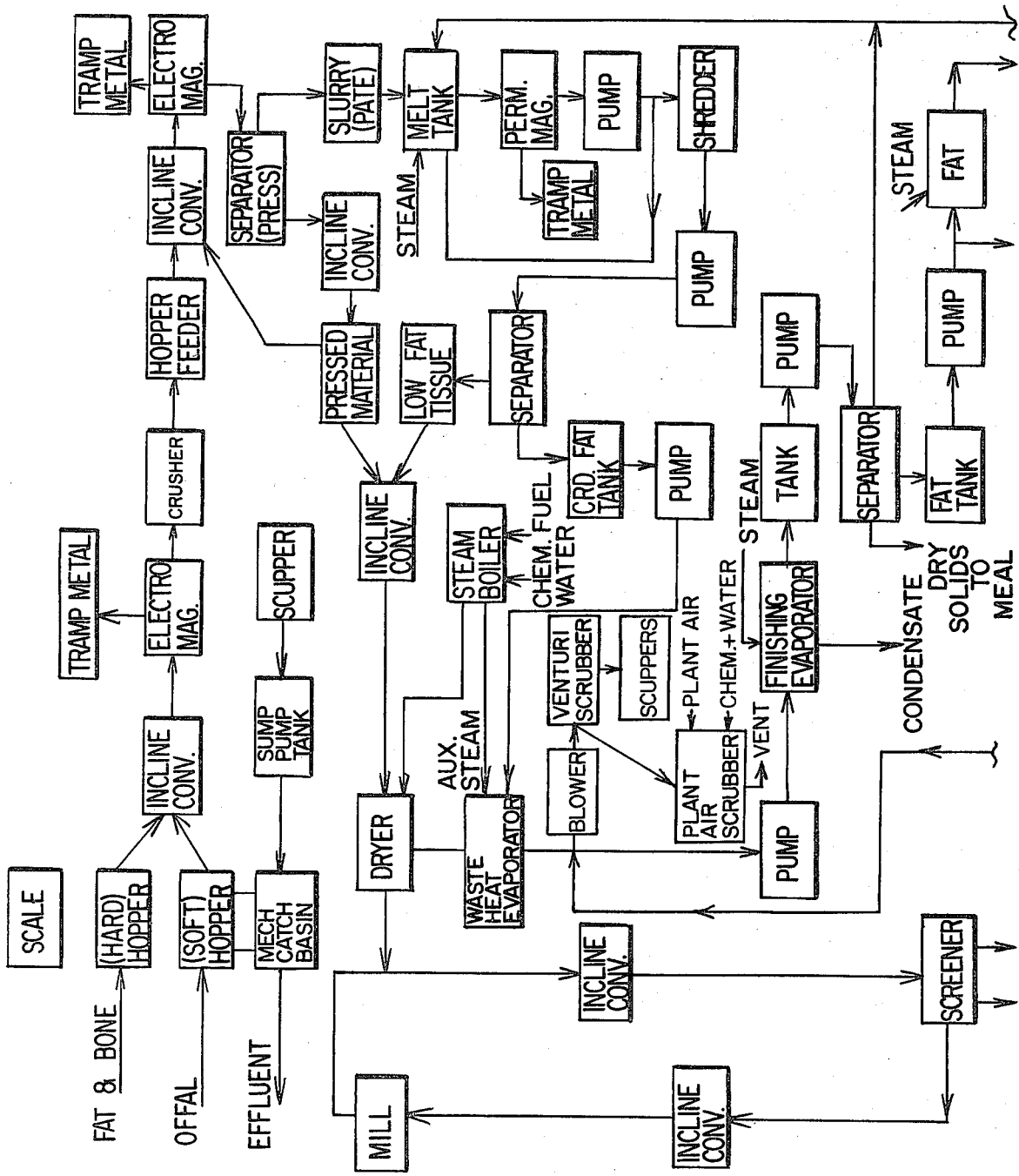
Figure 2B:
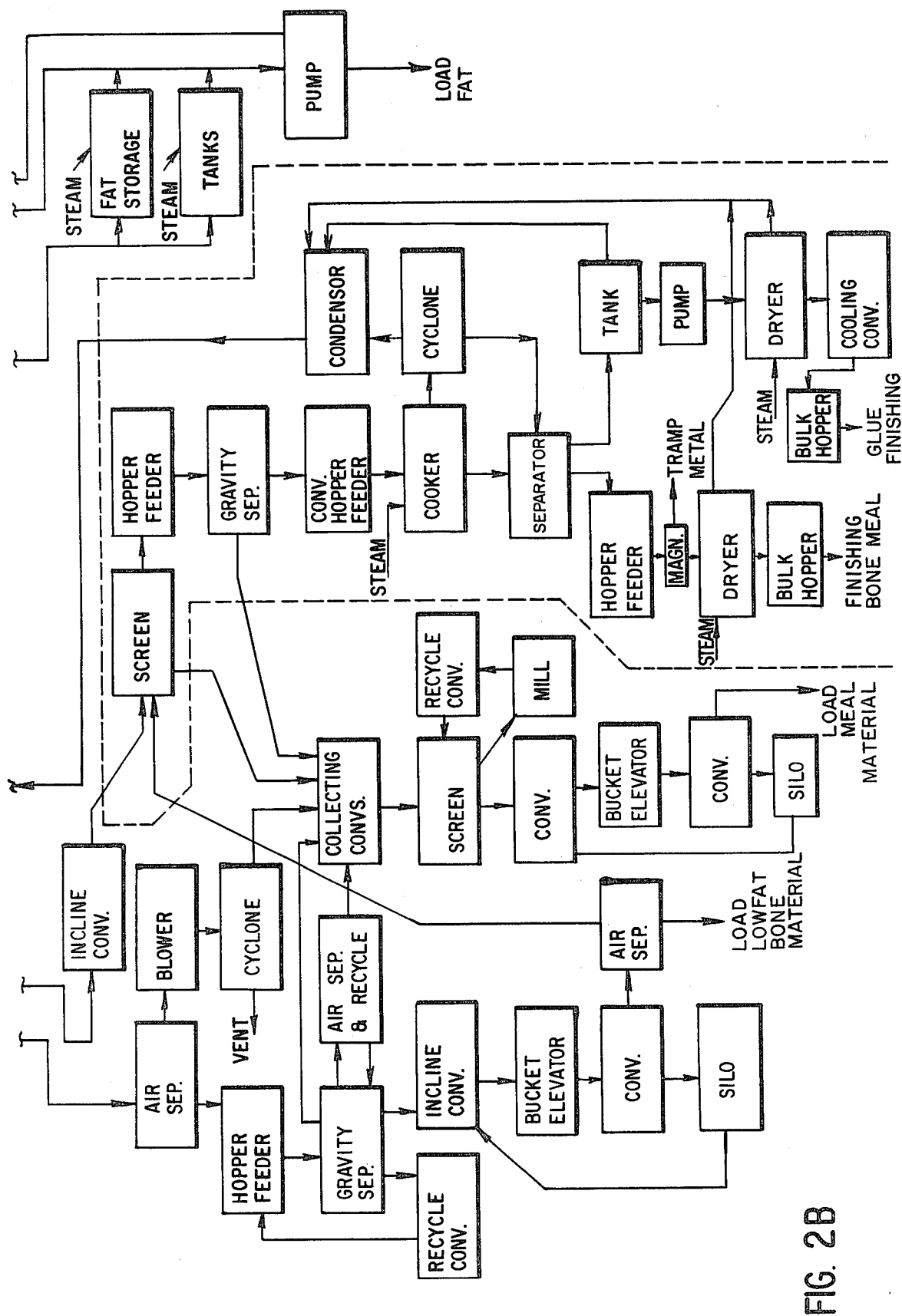
Figure 3A:
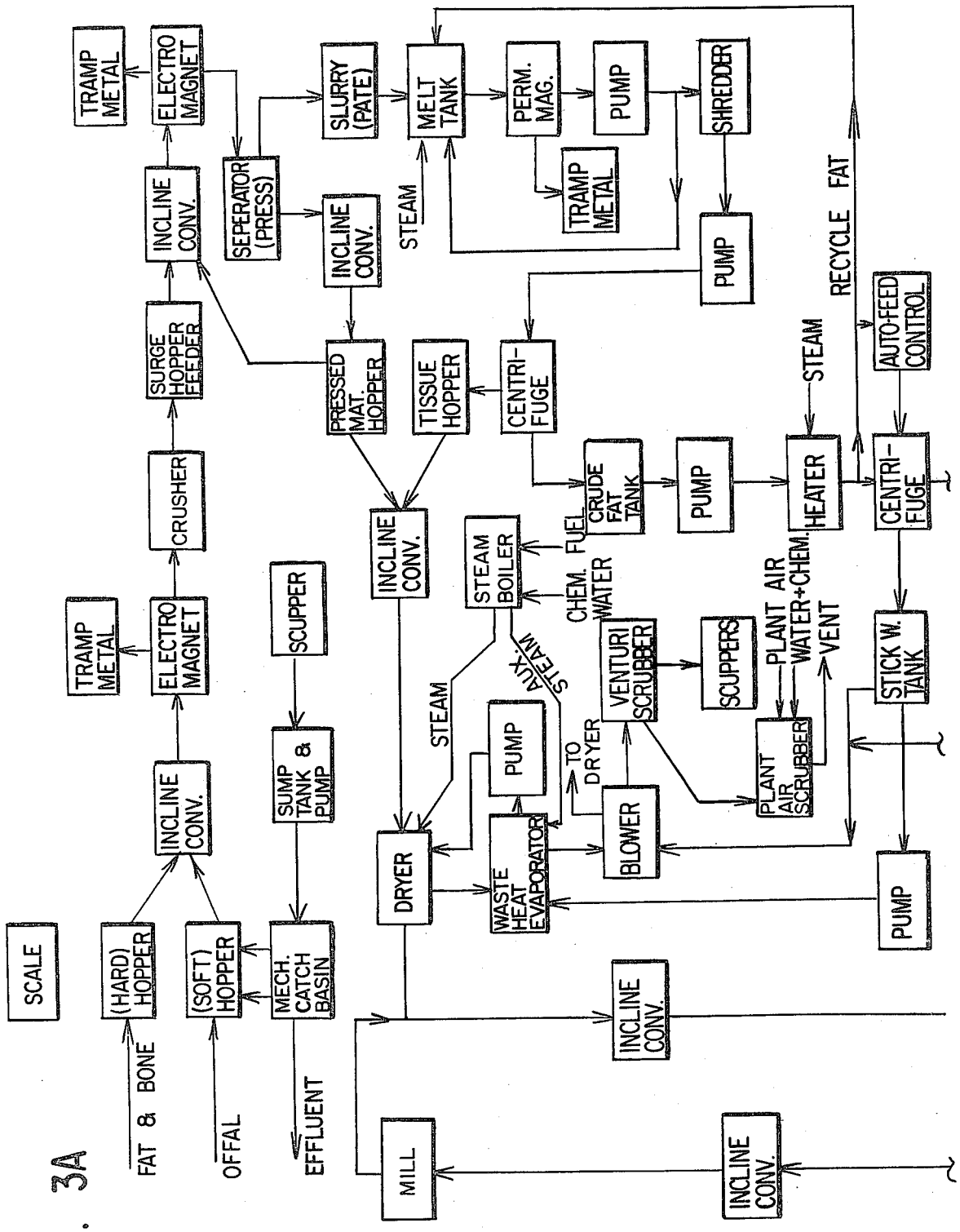
Figure 3B:
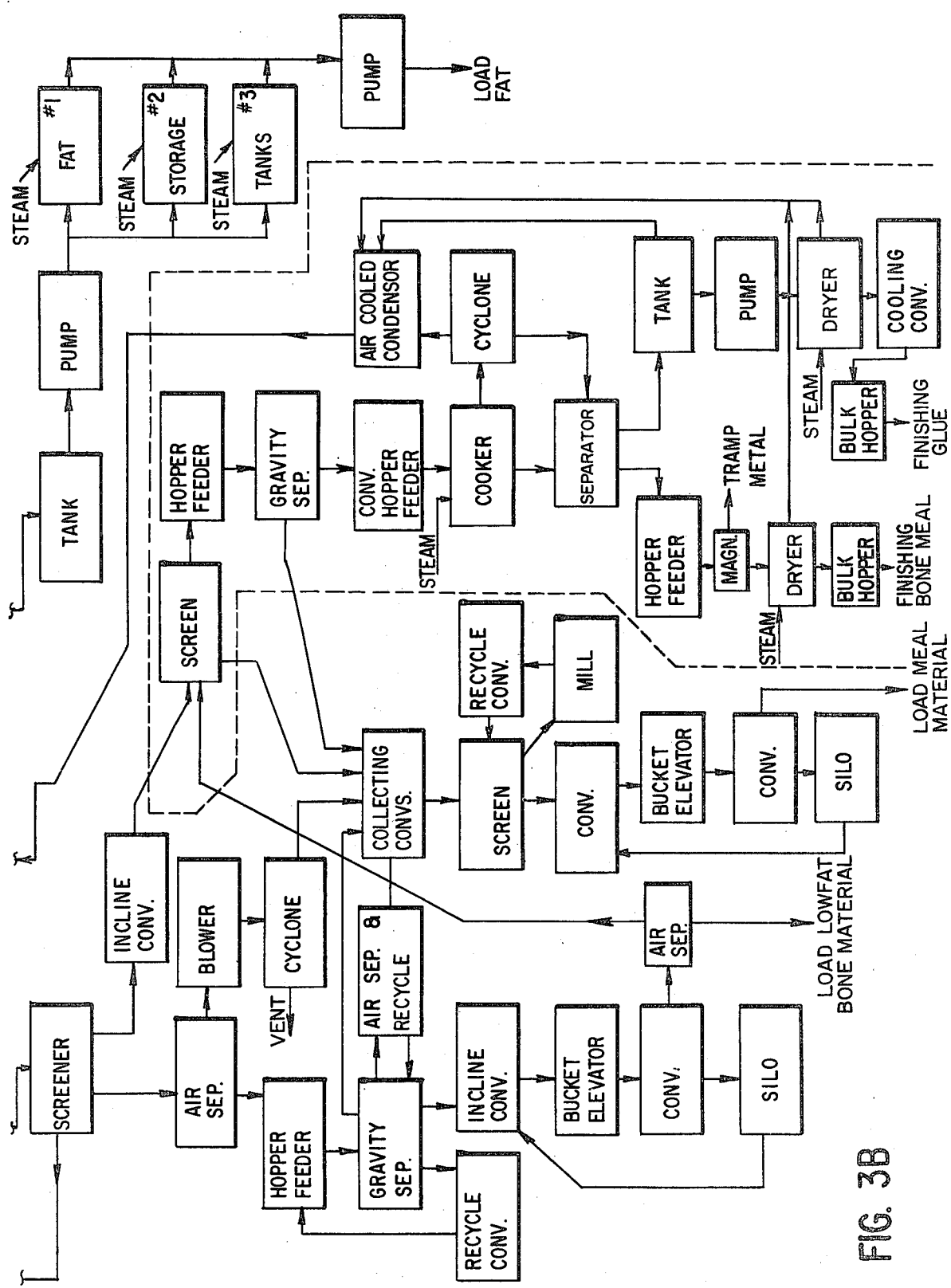

Other objects of the present invention will be apparent to one skilled in the art from the following detailed description and claims to follow when read in conjunction with the accompanying drawing wherein:

FIG. 1 shows a schematic block flow diagram of one embodiment of the present invention;

FIGS. 2A and 2B together show a schematic block flow diagram of a modified form of the process of the present invention; and FIGS. 3A and 3B together show a schematic block flow diagram of a further modified form of the process of the present invention.

The improved integrated low energy process of the present invention as disclosed in FIG. 1 of the drawing generally comprises the steps of:

(1) mechanically stripping raw organic material containing fat and proteinaceous materials, such as found in offal and similar raw organic material and trimmed raw bone, before the materials are finely divided and before the entire mass of raw material is heated to liquify the fat therein or to reduce significantly the moisture content of the raw material, and removing from the raw organic material in the form of an aqueous fluid slurry a major portion of the fat tissue (i.e. removing all but a maximum of about 5 wt.% and generally all but about 3 wt.% fat) and a large amount of the soft low density proteinaceous material contained in the raw organic material;

(2) liquifying the fat in the slurry with minimal heating and preferably shredding the solids in the slurry to improve fat separation;

(3) mechanically separating from the slurry substantially all the liquified fat as crude fatty material along with dissolved proteinaceous solids and water from the soft low density proteinaceous material contained in the slurry leaving essentially wet soft low-fat low density proteinaceous material (i.e. generally having a fat content of between about 2 and 5 wt.percent fat;

(4) combining (a) the wet low fat low density proteinaceous material and preferably with any solids separated from the crude fatty material, and (b) the pressed wet essentially hard low-fat proteinaceous material having a high density relative to said soft low density proteinaceous material in the slurry after the stripping step;

(5) drying the combined mixture of wet low fat low density proteinaceous material with solids separated from the fatty material and the wet hard high density material remaining after stripping by heating the mixture to a sterilizing temperature, preferably screening the dry mixture to remove any tramp non-magnetic material, such as hair, polyethylene film or paper and sizing the dry mixture to market specifications to form the stabilized meat meal material;

(6) drying and sterilizing the crude fat material comprising fat, dissolved proteinaceous solid material and water which has been separated from the slurry by heating the crude fat material at a sterilizing temperature preferably in a waste heat evaporator associated with the dryer to reduce the moisture content of the fat from about 35 wt.% to about 15 wt.% and heating the partially dried fat in a finishing evaporator at a temperature, preferably about 235° F., which reduces the moisture content of the fatty material to about ½ wt.% and effects drying the dissolved proteinaceous material in the fat, and thereafter effecting a separation as by allowing the suspended dried solid to settle out or preferably filtering the fat to remove residual dry suspended solids comprising proteinaceous material from the fatty material and providing a clean stable fat product; and preferably (in order to increase the recovery of protein material)

(7) conveying the residual dry suspended protein material separated from the fat to the meat meal product (See FIG. 1).

More particularly, clean stabilized low density proteinaceous solids (i.e. meat meal material) and stabilized high quality fat, can be separated and recovered as distinct products from raw material such as rendering material, raw fish material, raw poultry material, and raw animal material, such as trimmed raw bone and offal, according to the embodiment of the present invention shown in FIG. 1 of the drawing by depositing the raw material received from a slaughter house, a meat packing plant or a boning plant, etc. into a receiving bin or pit and continuously conveying the raw material by a screw conveyor or like means from the receiving bin past an electromagnet where tramp metal is removed is preferably passed through a rough size reducing apparatus where the raw material is reduced in size from its natural state to pieces preferably ranging between about 1 and 6 inches in length suitable for feeding into a press. The bone leaving the rough sizing apparatus is in the form of a flowable mixture containing bone, bone marrow, fat, meat tissue and liquid comprising blood, other body fluids and moisture. The raw material which can comprise bone with adhering fat and meat tissue are passed under a second electromagnet and fed into a press, preferably a continuous screw type press with the screw mounted within a cage or casing having perforations or small openings in a wall thereof. The screw press preferably has a choke mounted at the discharge end or other means for controlling the pressure applied to the raw material within the cage so that sufficient pressure can be applied to the raw material in the press to force a substantial amount of the fat and soft proteinaceous material along with fine bone and most of the liquid contained in the raw material through the small perforations or narrow openings in the wall of the cage while separately discharging from the end of the cage the pressed hard high density material (along with residual fat and meat tissue) comprising about 47 wt.% of the total raw material when raw trimmed bone is being stripped. The soft low density material which is discharged as a slurry from the press generally comprises about 53 wt.% of the raw material when processing raw trimmed bone. The raw material fed to the press is comprised of crude fat, meat tissue, sinew, cartilage, tendon, bone marrow and fluids along with bone material. The composition of the slurry comprised of soft low density material and moisture will vary depending on the composition of the raw material fed to the press. A slurry obtained by pressing raw trimmed beef bone will generally contain about 30 wt.% crude fat and 23 wt.% wet low fat tissue solids, based on 100% of the raw trimmed bone. After final drying of the wet low fat tissue about 10 wt.% dried tissue solids are obtained, again based on 100% of the raw trimmed bone. When the crude fat is dried, the yield of finished fat is about 18 wt.%, based on 100% of the raw trimmed bone material. A typical approximate composition of a slurry (pate) stripped from raw trimmed beef bone is 25 wt.% crude fat, 35 wt.% solids (i.e. soft tissue and fine bone), and 40 wt.% moisture. Soft low density material comprising the slurry stripped from raw beef slaughter offal and bone contained approximately 37.5 wt.% fat, 51.5 wt.% moisture, with the balance mainly solids. The slurry stripped from lamp slaughter offal and bone typically has a composition of 27 wt.% fat, 18 wt.% solids and 55 wt.% moisture. The pressure high density material discharged from the press generally comprises between about 30 and 48 wt.% of the raw material fed to the press and generally has a fat content of about 3 wt. percent fat, about 12 wt.% soft tissue and a moisture content of between about 20 and 30 wt. percent. The composition of the pressed high density material remains substantially the same regardless of variations in the amount of fat, meat tissue and moisture in the raw trimmed bone material fed to the press. As a specific example, pressed high density material from raw beef offal was found to contain about 40 wt.% moisture, 2.16 wt.% fat, 12 wt.% soft tissue and the balance mainly bone material or other high density proteinaceous material.

The soft essentially low density material in the slurry discharged from the press containing a major proportion of the fat in the raw material and soft meat tissue along with fine bone material is heated in a melting tank preferably to a minimal fat liquifying temperature between 125° F. and 190° F., and preferably at about 180° F. The heated slurry after passing over a permanent magnet to remove any remaining tramp metal is pumped through a shredder (i.e. wet hammer mill without plate) where the slurry is sized to a maximum diameter of preferably about ⅜ inch. The heated and sized slurry is fed continuously to a solid bowl centrifuge wherein the lighter fraction comprised mainly of fatty material and a minor proportion of moisture with dissolved solids therein is discharged into a crude fat holding tank, and the heavier fraction comprised essentially of soft wet low fat low density proteinaceous tissue material containing between about 2 and about 5 wt.% fat along with moisture and fine bone material is discharged into a low fat tissue holding hopper. The wet soft fat low density proteinaceous material or tissue is conveyed to a dryer where it is combined with the hard low fat high density proteinaceous material from the press. The foregoing mixture of low fat materials after drying is sized to provide a stable light colored meat meal product.

The crude fatty material discharged from the centrifuge is further treated preferably in a waste heat evaporator to reduce the moisture content to about 15 wt.% moisture and thereafter heated in a finishing evaporator to reduce the moisture content of the fat to about ½wt.% and then processed preferably by settling or filtering to remove the dried solids in the fat and provide a clean light colored fat product. The fat product (i.e. tallow) recovered from trimmed raw beef bone has the following typical analysis: between about 2-3 F.F.A, a color value of between about 5-7, about 0.46 wt.% moisture, about 0.25 wt.% unsaponifiables, a refined and Bleach (R & B) value of about 0.2r, and a titre of about 42 degrees C.

The mixture of wet low-fat low density proteinaceous material discharged from the centrifuge and the wet hard pressed high density proteinaceous material discharged directly from the press are continuously fed into a drier in which the materials are heated at a temperature of about 200° F. until any low fat meat tissues adhering to the pressed high density proteinaceous material are crisped and the moisture content of the low-fat low density proteinaceous material and small bone particles are reduced to a maximum of about 10 percent by weight moisture. The crisped low fat meat tissue are thereafter readily separated from the bone particles entirely by mechanical attrition during subsequent conveying, screening and sizing of the dry materials. The drying step also sterilizes and stabilizes the low density proteinaceous solids (i.e. meat meal material) and the bone particles (i.e. high density proteinaceous solids). The dried material is screened and sized by recycling through a reduction mill to provide a stabilized low fat meat meal material suitable for storage under dry ambient conditions. The meat meal material obtained where hard high density beef bone material has been separated as described herein generally comprise between about 20 wt.% and about 30 wt.% of the raw material; and the meat meal material composition generally will fall between about 6-10 wt.% fat, about 33-63 wt.% protein, about 25-48 wt.% ash and between about 3-10 wt.% moisture regardless of the type of raw material used. Higher levels of protein will be found in poultry meal (i.e. about 68 wt.% protein) and in fish meal. The ash content of poultry meal will be less than about 16 wt.%, whereas the maximum ash content for meat meal material is preferably about 37 wt.% ash.

When the raw material fed to the press contains a large proportion of high density proteinaceous material in the form of hard bone, such as in trimmed raw bone, market mix of fat and bone or dead stock as opposed to conventional rendering material and offal, it is desirable to subject the dried mixture of dried low fat high density proteinaceous material and low fat low density proteinaceous material to a dry separation treatment which removes from the mixture a substantial proportion of the bone material (i.e. high density proteinaceous material) in order to reduce the ash content of the protein meal product. As meat meal preferably has a maximum of about 35 wt.% ash, it is important to be able to control the ash content of the meat meal in the above manner and thereby avoid lowering the quality of the meat meal product.

The preferred dry separation treatment for removing bone material contained in the dry mixture of low fat low density of low fat high density proteinaceous materials from the drier is shown schematically in FIGS. 2A and 2B of the drawing (and also in FIGS. 3A and 3B) and comprises subjecting the mixture of dry low density proteinaceous material and particles of the high density bone having crisped meat tissue associated therewith to a screening and sizing treatment which preferably separates from the dry mixture a fraction having a selected particle size range most useful in making high quality gelatin. The selected particle size material from the screen sizer preferably is continuously passed through an air separator which removes much of the light bone particles and low-fat low density proteinaceous material which can be used in the meat meal product. The remaining selected particle size material comprised mainly of clean high density bone material is deposited on a gravity separator means. The oversize material is recycled to the hammer mill and is rescreened, and the undersize material is conveyed to a secondary screener and gravity separator for further treatment.

The gravity separator means preferably is an inclined vibrating screen air table on which the higher density particles are collected at the upper end section with the low density particles remaining at the lower end section of the air table. The dry separation treatment separates the high density bone material from substantially all the low fat low density meat tissue and produces consistently a clean stabilized bone material generally having a fat content of about 3 percent by weight and a moisture content of about 8 percent by weight, a protein content of about 30 percent by weight and an ash content of about 60 percent by weight. The high density bone material produced meets the specification for the highest quality gelatin bone product.

The undersize material from the first or primary screening following oven drying can be separated into high density bone material having a small average particle size (i.e. rice bone) and low-fat low density proteinaceous material (i.e. meat meal material), having very fine bone particles therein, and the separation preferably is achieved by secondary screening and gravity separation means similar to those previously described.

The low density material removed by the air separator from the selected fraction of the primary screening means, the low density material discharged from the lower end of the gravity separator means, the low density material removed from the recycled air stream of the gravity separator means, the low density material recovered from the undersized fraction in the secondary screening means, and the low density material recovered from the undersized fraction of the secondary gravity separation means are all combined to form the meat meal material. A typical meat meal produced in the above manner from trimmed beef bone has a composition of about 49.62 percent protein, about 7.4 percent fat, about 34.78 percent ash and about 5.27 percent moisture.

The modified form of the invention shown in FIGS. 3A and 3B of the drawing is similar to that of FIGS. 2A and 2B with regards to the separation and recovery of meat meal material and bone material, but differs with regards to the method of obtaining clean stabilized fat from the crude fatty material and the processing of the dissolved proteinaceous solids in the crude fatty material. Thus, in the process of FIGS. 3A and 3B the crude fatty material from the crude fat holding tank is heated to sterilizing temperature of about 200° F. and fed into a split bowl centrifuge where the fat is separated as clean stabilized light colored fat containing about ½ wt.% moisture. Water is periodically added to flush solids from the centrifuge when the bowl is split, and the flushing water and solids are added to stickwater from the centrifuge. The stickwater centrifuged from the crude fat along with dissolved proteinaceous solids preferably are pumped to a waste heat evaporator associated with the dryer where the dissolved proteinaceous solids are concentrated from about 15 wt.% solids to about 55 wt.% solids by heating in a vacuum at a temperature of preferably about 140° F. Thereafter the concentrated solids are preferably fed into the dryer and ultimately form part of the meat meal. By treating the stickwater in the foregoing manner additional protein (about 2 wt.% protein) is recovered for meat meal, and it is unnecessary to discharge a material having a high BOD content into the plant waste water where treatment would be required.

Raw Material

While any raw organic materials containing fat and proteinaceous material can be used in one or more of the embodiments of the process of the present invention, the preferred raw material used in the process is raw animal material containing fat and proteinaceous material and includes any rendering material used in the presently known wet or dry rendering processes, offal from livestock, animals, poultry and fish, carcasses from animals, poultry or fish, restaurant waste, market fat and bone mix, trimmed bone from boning plants and slaughter houses, hide pieces and dead stock. While mixtures of any of the foregoing raw material can be used, the raw material before processing is preferably separated into (1) hard bone material which has associated fat and meat tissue or (2) soft offal material which generally consists mainly of internal organs of the slaughtered mammals and may have feet and non-meat parts and does not contain a large amount of hard bone material. The percentage of fat, tissue, bone and moisture in each of the raw materials can vary over a wide range. The hard bone raw material is preferably deposited in one feed hopper and the soft offal material is deposited in a separate hopper. Each of the feed hoppers is equipped with a screw conveyor means which carry the raw material from the hopper past an electro magnet which removes tramp metal to a conventional rough sizer which reduces the size of the raw material too large to be fed directly into a press to pieces ranging in size between about 1 inch by 1 inch and about 1 inch by 6 inches. The raw material is then preferably conveyed to a surge-hopper-feeder to insure a continuous supply of raw material for further continuous processing in a stripper means when the raw material is intermittently delivered to the receiving pits. The raw material as discharged from the rough sizer to which raw trimmed bone is fed has about 50 wt.% total solids and has an approximate composition on a weight basis of about 30 to 40 percent moisture, about 20-30 percent meat tissue about 15 to 20 percent fat, and about 18 to 22 percent bone which is useful for glue or gelatin with additional bone going into the meat meal material. The crushed raw material has a bulk density of about 56 pounds/ft$^3$. When slaughtering offal is the raw material, the moisture content can be as high as 68 wt.% and the fat content can be as low as 8 wt.% fat.

Raw Bone Stripper

Conveyor means carry the raw material, preferably crushed in a crude sizer and stored for a limited time in a surge-hopper, over a second magnetic separator adapted to remove any remaining tramp metal and continuously feeds the crushed raw material in the preferred embodiment into a screw type press mounted within a cage which preferably has adjustable lateral slots therein spaced a distance less than the minimum size desired in the final product (i.e. about 0.095 inches when producing bone for high grade gelatin) and preferably having a choke mounted axially therein at the discharge end of the cage adapted to maintain a pressure on the raw material within the cage. A specific example of a satisfactory screw press is a 10 inch Duke Pressor TM manufactured by the Dupps Company of Germantown, Ohio. The 10 inch Duke Pressor ™ has a capacity of about 20,000 pounds per hour and employs an interrupted screw flight to prevent forming a mass of high density particles along the wall of the cage. When pressing raw trimmed bone with the Duke Pressor ™ a choke pressure of preferably about 300 psi is applied to the raw trimmed bone material using 75–80 percent power in a 200 horsepower electric motor for efficiently separating the soft low density proteinaceous tissue and fat from the raw high density proteinaceous material. The pressed soft material is discharged from the raw bone stripper as a viscous aqueous fluid slurry at a rate of 9,000 lb/hr and the pressed hard low fat high density material is discharged from the stripping press at a rate of about 8,000 pounds per hour. The hard high density proteinaceous material is reduced in the press to pieces having a maximum diameter of about 1½ inches with the size ranging from about ⅛ inch to 1½ inch and generally between ¼ inch and 1¼ inches. And, regardless of the composition of the raw material fed to the press, the pressed hard high density material discharged from the screw press when operated in the foregoing manner has a fairly uniform composition and will generally contain between about 20 to 25 wt. percent moisture, about 10 to 12 wt. percent meat tissue and between about 3 and 6 wt. percent fat. The high density material discharged from the stripper, has a temperature of between about 110° F. to about 120° F. due entirely to friction within the press. If greater pressure is applied to the raw material in the press, the pressed hard high density material will have a smaller average particle diameter and contain an even smaller percentage of fat, meat tissue and moisture.

It will be evident that a major proportion of the fat along with a large amount of the soft low density proteinaceous tissue associated with the raw material fed to the press is separated from the hard high density proteinaceous material by the stripping press and that the press is a very effective means for removing fat and protein tissue from crushed raw proteinaceous material containing fat and protein tissue without the necessity of contacting the entire mass of raw material with a heated aqueous solution or heated bath of molten fat and without reducing the entire mass of the raw material to a small particle size.

Melt Tank

The soft low density material containing fat and meat tissue which was strippd from the raw animal material is fed as a flowable aqueous fluid slurry into a melt tank which preferably is a jacketed stainless steel kettle adapted to be steam heated, and the slurry is preferably heated to a temperature above about 125° F. to effect melting the fat. If desired, the slurry can be heated to a temperature not substantially in excess of 180° F. for a short time in order to kill micro-organisms which induces hydrolysis of the fat, but heating should not be so long or high as to denature a substantial amount of the protein in the slurry or darken the color of the fat.

Shredder

The slurry of stripped soft low density proteinaceous material when heated in the melt tank to a fat liquifying temperature preferably about 180° F., is passed over a permanent magnet to remove residual tramp metal and pumped into a shredder which preferably consists of a wet hammer mill without plate having a ⅜ inch screen through which the slurry solids are forced by the rotating hammers to shred fibers and release fat and moisture. The shredded slurry material is then pumped to a solid bowl centrifuge.

Solid Bowl Centrifuge

The shredded slurry at a temperature of up to about 180° F. is preferably fed into a solid bowl centrifuge adapted to separate the liquified fat fraction containing water and dissolved protein solids from the wet soft low density proteinaceous material comprising meat tissue, small bone material, hair, and tramp solid material, such as polyethylene and paper, etc. and containing about 55 wt.% moisture and generally only about 3 wt.% fat. The liquified fat fraction is collected in a crude fatty material holding tank and thereafter treated to remove moisture and dissolved solids. The wet soft low-fat low density proteinaceous material is combined with the hard low fat high density proteinaceous material from the press and the mixture fed into a dryer.

Waste Heat Evaporator

The crude fatty material from the centrifuge is pumped to a primary evaporator which preferably utilizes exhaust vapors from the dryer or hot vapors recovered from other sources in the plant (i.e. waste heat) for heating the primary evaporator instead of live steam from a steam boiler. A preferred type of waste heat evaporator is made by Stord Bartz, A.S. of Bergen, Norway, and is a vacuum type waste heat evaporator. The vapor is supplied to the waste heat evaporator at a temperature of about 200°–212° F. (100° C.), and the boiling temperature in the vacuum waste heat evaporator is 95°–130° F. (35°–45° C.). The moisture content of the crude fatty material is reduced to about 15 wt.% moisture in the waste heat evaporator before passing the fatty material to a finishing evaporator.

Fat Finishing Evaporator

The partially dried crude fatty material containing about 15 wt.% moisture and suspended proteinaceous solids is pumped to a finishing evaporator heated at least to about 235° F. by boiler steam to effect reducing the moisture content to about ½ wt.% moisture. The dry fat containing suspended dry solids is preferably separated by settling or filtering to remove dry suspended solids and provide a stable light colored fat product.

Split Bowl Centrifuge

An optional procedure (as shown in FIGS. 3A and 3B of the drawing for treating the crude fatty material from the solid bowl centrifuge, comprises heating the crude fatty material and feeding the heated fatty material (200°–225° F.) to a split bowl centrifuge adapted to separate stabilized light colored fat from stickwater which comprises water with residual proteinaceous solids (8–10 wt.%) and fat. The residual solids are periodically flushed from the split bowl by flush water. The stickwater and flush water are preferably pumped to a waste heat evaporator wherein the solids comprising proteinaceous material are concentrated at about 140° F. to about 50 wt.% solids and the concentrated dissolved solids are pumped to the dryer where they are mixed with wet low fat proteinaceous solids for processing into dry meat meal.

Dryer

While each of the wet low fat proteinaceous materials can be dried separately, in the preferred embodiment of the present invention the wet low fat low density proteinaceous material from the solid bowl centrifuge and the wet hard low fat high density proteinaceous material from the press are combined and dried simultaneously in a dryer to a moisture content below about 10 wt.% moisture in a drying apparatus which preferably is a rotary disc dryer, such as the Rotadisc ™ dryer manufactured by Stord Bartz, A.S. of Bergen, Norway. The feature of the rotary disc dryer is the large heating surface provided by the hollow heated discs. The Rotadisc ™ dryer disc are preferably heated by steam at a super-atmospheric pressure up to about 85 psig. The interior of the dryer can be provided for vacuum operation, if desired.

A dryer which has also been found suitable for drying pressed raw hard low fat proteinaceous material and the wet raw low fat soft proteinaceous material is a continuous rotating tray type vertical transfer dryer, such as a Wyssmont Turbo Dryer ™ manufactured by the Wyssmont Company, Fort Lee, New Jersey, in which the raw low-fat materials are continuously moved through the dryer having a plurality of vertically spaced trays which are continuously rotating about the vertical axis of the oven and has stationary wipers which wipe the pressed bone material off each tray onto a tray below while continuously circulating heated gas around the trays.

Other types of heaters can be used for drying the raw low fat proteinaceous materials and crisping the tissue adhering to the bone particles, such as a rotary steam tube dryer and a rotary hot air direct or indirect fired rotating drum dryer, but care must be exercised to avoid using such elevated temperatures or prolonged retention times within a direct fired rotary drum which result in burning or scorching the material, particularly when drying bone particles of about ½ inch in diameter or larger.

The low density proteinaceous material and the high density proteinaceous material with adhering crisped tissue material discharged from the dryer as a dried low fat mixture are preferably air cooled to about ambient temperature after being discharged from the dryer and while being transported preferably on a tumbling conveyor means. If desired, the conveyor can be enclosed within an air cooled jacket to further increase the cooling and fragility of the crisped pieces of tissue adhering to the bone particles before depositing the dried low fat mixture onto a screen separator and/or sizer.

Screen

The dried low fat proteinaceous materials are conveyed to a screening and sizing apparatus which preferably is a deck type screen which vibrates reciprocably in a declining plane, such as a Rotex ™ screen manufactured by Rotex, Inc., Cincinnati, Ohio. The oversize material from the screen is preferaly recycled to a hammer mill to reduce the particle size so that the material will pass through the selected screen size. Substantially all of the dried low fat proteinaceous material passing through the selected size screen, preferably about an 8 mesh (US Std.) size screen, without requiring sizing in the hammer mill so that only a small amount of energy is expended in sizing and the sized material is passed to storage and comprises a stable meat meal or meat and bone meal product. The approximate analysis of meat meal material obtained in the above described process by processing beef offal containing added slaughter bone material is about 40 wt.% protein, 7.5 wt.% fat, 37 wt.% ash and 9 wt.% moisture.

When it is desired to reduce the amount of bone material (i.e. reduce the ash content) in the meat meal material or to produce clean stablized bone for making gelatin of high quality from raw bone containing animal material, the dried low fat mixture is processed in an apparatus suitable for separating high density bone material preferably having a select particle size range between ⅛ inch and ¾ inch, from the dried low fat mixture. One such apparatus is a vibrating two deck gravity screen separator adapted to remove particles of bone and organic tissue which are larger or smaller than desired in the final product, and then subjecting the selected particle size material to dry gravity separation. A suitable screen separator or sizer for producing high grade gelatin bone is a 34-4800 "Screenaire"( ™ ) vibrating screen separator manufactured by Forsbergs, Inc. of Thief River Falls, Minnesota, which has a capacity of about 12,000 pounds per hour. The upper of the two spaced vibrating screens when producing high grade gelatin bone preferably is a 2-mesh screen which retains particles in excess of about ¾ inches in diameter and the lower screen is a 6-mesh screen which retains particles larger than about ⅛ inch so that the selected middle fraction which is recovered for further processing has a size range of 3/16 inches to ⅝ inches in diameter. The oversized material is preferably recycled through a crushing mill. The undersized material having a particle size fraction below 3/16 inches is conveyed to a screen sizer and a gravity separator which separates the undersized material into clean fine "rice bone" and meat meal.

The selected sized material from the screen separator is preferably passed through an air separator before transfer of the material to a gravity separator to recover the very low density particles of proteinaceous material in order to increase the efficiency of the gravity separation step and obtain valuable meat meal material.

Gravity Separator

The selected sized material from the screen is continuously conveyed to a dry gravity density separator which is adapted to recover the low density particles of meat meal and provide a clean high density bone fraction which form the desired low fat stablized gelatin bone product having a particle size within the selected range preferred for making high grade gelatin. The density separation is carried out by continuously depositing the selected size material from a surge-hopper by means of a vibrator feeder onto the dry gravity separator table which in the preferred form comprises a reciprocating inclined air table having a 10-mesh screen deck. A suitable gravity separator is manufactured by Forsbergs, Inc. which has a capacity of about 4000–5000 pounds per hour. The air pressure, the rate of reciprocation as well as the inclination of the screen deck of the Forsbergs gravity separator can be varied to provide the desired degree of density separation and final product. The particles of bone having a high density move upwardly along the screen deck and are collected at the upper end of the screen deck separately from the low density particles of fat and meat tissue along with a small amount of light bone which remains at the lower end of the vibrating screen deck. The very low density material which concentrates at the bottom of the inclined separator table is comprised essentially of crisped fat and meat tissue which can be used in meat meal. The intermediate density particles are preferably recycled through the gravity separator.

The high density material which is collected at the upper end section of the gravity separator table is high quality, clean, stablized bone material useful for making the highest quality gelatin (i.e. photographic gelatin). Clean stabilized bone product obtained in the above described manner from a raw trimmed beef bone material has the following typical composition: 4.65 percent moisture, 2.49 percent fat, 1.98 percent soluble ammonia, 29.05 percent protein, and 61.68 percent ash, all on a weight basis.

While the amount of each type of material separated and recovered from the raw material will depend on the amount of pressure applied to the raw material in the press, the manner in which the crusher mill, screener and gravity separator are operated, the yield of clean stabilized gelatin bone having the indicated select particle size range and the foregoing analysis separated from the low fat low density proteinaceous material and fat by the herein disclosed process has been as high as about 15.6 wt. percent but averages about 12 percent by weight based on 100 percent of the raw material consisting of raw trimmed bone. And, the clean stabilized fine bone material or "rice bone" obtained from the undersized material recovered from the screen separator ranges between about 8 to 12 percent by weight with an average of about 10 percent by weight of the original raw trimmed bone material. The "rice bone" is of substantially the same high quality as the fraction of high density gravity separated stabilized gelatin bone product having the selected particle size range. Gelatin and glue of high quality can be made from rice bone obtained from the undersized material from the screener.

The term "stable", "stabilizing" and "stabilized" as used in the specification and/or claims to characterize the products formed according to the present invention designate material which when held for a prolonged period does not develop objectionable odors, does not discolor and is not attacked by bacteria, fungus or similar microoganisms. With bone material intended for use in producing high quality gelatin, the bone must be substantially free of adhering meat tissue and have a low fat content (i.e. a maximum fat content of 3 percent by weight) in order to facilitate the production of high quality gelatin without fat interference, even though bone can be stabilized with a higher fat content (i.e. up to 10% by wt.). The meat meal product and bone material must also be heated during processing to effect stabilizing, preferably when removing moisture, to a temperature above 180° F. (82° C.) to produce a "kill temperature" for any microorganisms which may contaminate the raw bone and simultaneously reduce the moisture content of the bone to a maximum moisture content of 12 percent by weight and preferably below 10 percent by weight so that growth of microorganisms will not be supported.

It will be understood that in the process of the present invention where raw poultry material or raw fish material is used as the raw material for the press instead of raw animal material, the low fat low density proteinaceous product produced will be poultry meal material or fish meal material instead of meat meal material and the description and claims should be construed accordingly.

I claim:

1. A continuous low energy rendering process for separating fat from proteinaceous material in raw organic material which contains fat, water and proteinaceous material to provide stabilized fat and stabilized protein products comprising;

(a) pressing said raw organic material in a press having a perforated wall section which permits passage therethrough of fat and soft low density proteinaceous material to mechanically strip from said raw organic material a major proportion of the fat and a large amount of the soft low density proteinaceous material from said raw organic material without subdividing said raw organic material to a size substantially smaller than required for feeding said raw organic material into said press and without applying heat to said raw organic material in order to liquify the fat therein and reduce significantly the moisture content of the raw organic material, and recovering said fat and said low density proteinaceous material along with small fragments of high density proteinaceous material in the form of a fatty aqueous fluid slurry while forming in said press a raw stripped residue comprised mainly of pressed wet low-fat high density proteinaceous material;

(b) liquifying the fat in said slurry by applying heat to said slurry;

(c) separating from said slurry a major portion of the liquified fat along with extruded water containing dissolved proteinaceous solids as crude fatty material and leaving as a residue wet essentially low-fat soft low density proteinaceous material containing said small fragments;

(d) combining and drying said low-fat soft low density proteinaceous material from step (c) and said low-fat high density proteinaceous material from step (a) to form a stable low-fat protein meal material; and (e) heating said crude fatty material to effect sterilization of said fat and said dissolved proteinaceous solids and separating fat from said water and proteinaceous solids to provide a clean stabilized fat product.

2. A continuous low energy rendering process for separating fat from proteinaceous material in raw organic material containing fat, water and proteinaceous material to provide stabilized fat and stabilized protein products comprising;

(a) pressing said raw organic material in a press having a perforated wall section permitting passage of fat and soft low density proteinaceous material to mechanically strip from said raw organic material in said press a major proportion of the fat and a large amount of the soft low density proteinaceous material from said raw organic material without subdividing said raw organic material to a size substantially smaller than required for feeding said raw organic material into said press and without applying heat to said raw organic material in order to liquify the fat therein and reduce significantly the moisture content of the raw organic material, and recovering said fat and said low density proteinaceous material along with small fragments of high density proteinaceous material in the form of a fatty aqueous fluid slurry while forming in said press a raw stripped residue comprised of essentially pressed wet low-fat high density proteinaceous material;

(b) heating said slurry to a fat liquifying temperature between 125° F. and 190° F.;

(c) separating from said slurry without adding water to said slurry a major proportion of the liquified fat along with extruded water containing dissolved proteinaceous solids as crude fatty material leaving essentially wet soft low-fat low density proteinaceous material containing small fragments of high density proteinaceous material;

(d) heating said crude fatty material to effect sterilization of said fat and said dissolved proteinaceous solids and separating fat from said water and proteinaceous solids to provide a clean stabilized fat product; and (e) combining and drying said low-fat low density proteinaceous material from step (c) and said low-fat high density proteinaceous material from step (a) by heating at a sterilizing temperature to form a stable low-fat protein meal containing high density proteinaceous material.

3. A continuous low energy rendering process for separating fat from proteinaceous material in raw organic animal material containing fat, water and proteinaceous material to provide stabilized fat and stabilized protein products comprising;

(a) pressing said raw organic animal material in a screw type stripping press having a perforated wall section which permits passage therethrough of fat and soft low density proteinaceous material to mechanically expel from said press a major proportion of the fat and a large amount of soft low density proteinaceous material contained in said raw organic animal material without subdividing all the raw organic animal material to a size substantially smaller than required for feeding said raw organic material into said press and without applying heat to said raw organic animal material in order to liquify the fat therein and reduce significantly the moisture content thereof, and recovering in the form of a fatty aqueous fluid slurry said fat and said soft low density proteinaceous material along with small fragments of high density proteinaceous material which pass through said perforated wall section while forming a raw stripped residue within said press comprised mainly of pressed low-fat high density proteinaceous material;

(b) heating said slurry to a fat liquifying temperature of between 125° F. and 190° F.

(c) mechanically separating from said slurry without adding water to said slurry a major proportion of the liquified fat as crude fat material in the form of a fatty liquid containing extruded moisture having dissolved protein solids therein and recovering a residue formed essentially of wet soft low-fat low density proteinaceous material;

(d) heating said crude fat material to effect sterilization of said fat and protein solids and separating said fat from said water and said protein solids to provide a clean stabilized fat product; and (e) combining and drying said low-fat low density proteinaceous material from step (c) and said low-fat high density proteinaceous material from step (a) at a sterilizing temperature to form a stabilized low-fat protein meal containing high density proteinaceous material.

4. A process as in claim 3, wherein said raw stripped residue is comprised mainly of bone with said residue having a fat content between about 3 and about 6 wt.% fat.

5. A process as in claim 4, wherein said drying reduces the moisture content below about 10 wt.% to provide stabilized low-fat protein meal containing bone.

6. A process as in claim 4, wherein the combined said low-fat low density proteinaceous material and said low-fat high density proteinaceous material after drying are subjected to a gravity separation treatment to effect removal of high density proteinaceous material contained in said stripped residue to provide protein meal having a reduced ash content.

7. A process as in claim 4, wherein said stabilized low-fat protein meal containing bone is sized to provide sized material having a particle size ranging between about ⅛ inch and about ¾ inch while collecting undersized material separately and subjecting the sized material to dry gravity separation to recover bone material of a size beween about 3/16 inch to about ⅝ inch having a quality suitable for making high grade gelatin material.

8. A process as in claim 7, wherein said undersized material having a particle size below ⅛ inch is sized to provide material having a select particle size range between about 5 mesh and 20 mesh, and subjecting said material having the select particle size range to a gravity separation treatment to remove non-bone material and provide clean stabilized bone material.

9. A process as in claim 3, wherein solids in said slurry are subdivided to a maximum particle size of about ⅜ inch before separating fat from said slurry.

10. A process as in claim 3, wherein said slurry is heated to a fat liquifying temperature of about 180° F. at which micro-organisms inducing hydrolysis of fat are killed.

11. A process as in claim 3, wherein said crude fat material containing moisture with dissolved protein solids is heated in a waste heat evaporator to reduce the moisture content thereof to about 15 wt.% and dried to a maximum moisture content of about 0.5 wt.% in a finishing evaporator at a fat sterilizing temperature and separating said fat from said dissolved protein solids to provide said clean stabilized fat product.

12. A process as in claim 13, wherein said crude fat material containing moisture with dissolved protein solids is heated to a fat sterilizing temperature and centrifuged to separate said moisture and dissolved protein solids from said fat material to provide a fat product having a moisture content of about 0.5 wt.%, heating said moisture and protein solids separated from said fat material to reduce the moisture content thereof, and combining and drying said solids having a reduced moisture content with said low-fat low density proteinaceous material and said low-fat high density proteinaceous material to provide an increase in the protein content of said stabilized low-fat protein meal containing high density proteinaceous material.

* * * * *